United States Patent
Mangal et al.

(10) Patent No.: US 7,634,558 B1
(45) Date of Patent: Dec. 15, 2009

(54) METHOD AND SYSTEM FOR UPDATING NETWORK PRESENCE RECORDS AT A RATE DEPENDENT ON NETWORK LOAD

(75) Inventors: Manish Mangal, Overland Park, KS (US); Arun Santharam, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 953 days.

(21) Appl. No.: 10/667,881

(22) Filed: Sep. 22, 2003

(51) Int. Cl.
*G06F 15/16* (2006.01)

(52) U.S. Cl. ...................... 709/224; 709/235

(58) Field of Classification Search ......... 709/201–205, 709/217–226, 232–235
See application file for complete search history.

(56) References Cited

U.S. PATENT DOCUMENTS

| | | | |
|---|---|---|---|
| 5,738,144 A | 4/1998 | Rogers | |
| 5,794,140 A | 8/1998 | Sawyer | |
| 6,014,694 A * | 1/2000 | Aharoni et al. | 709/219 |
| 6,078,957 A * | 6/2000 | Adelman et al. | 709/224 |
| 6,108,542 A | 8/2000 | Swanchara et al. | |
| 6,212,175 B1 * | 4/2001 | Harsch | 370/338 |
| 6,681,256 B1 | 1/2004 | Kuntze et al. | |
| 6,745,998 B2 | 6/2004 | Doyle | |
| 6,819,926 B2 | 11/2004 | Karlsson et al. | |
| 7,088,698 B1 * | 8/2006 | Harsch | 370/338 |
| 7,193,985 B1 * | 3/2007 | Lewis et al. | 370/338 |
| 7,213,065 B2 * | 5/2007 | Watt | 709/223 |
| 2002/0129159 A1 * | 9/2002 | Luby et al. | 709/236 |
| 2002/0152432 A1 * | 10/2002 | Fleming | 714/47 |
| 2002/0152446 A1 * | 10/2002 | Fleming | 714/815 |
| 2003/0136932 A1 | 7/2003 | Doyle | |
| 2004/0124389 A1 | 7/2004 | Phillips | |
| 2004/0230661 A1 * | 11/2004 | Rashid et al. | 709/207 |
| 2004/0243702 A1 * | 12/2004 | Vainio et al. | 709/224 |
| 2005/0009534 A1 | 1/2005 | Harris et al. | |

OTHER PUBLICATIONS

M. Handley et al, RFC, 2543, SIP: Session Initiation Protocol, Mar. 1999, first page.*
S. Donovan et al., Session Initiation Protocol Extention for Session Timer, Jul. 1, 2002, Internet Engineering Task Force.*
Office Action from U.S. Appl. No. 11/038,944, dated Apr. 17, 2008.
Office Action from U.S. Appl. No. 11/038,944, dated Jan. 14, 2008.
Office Action from U.S. Appl. No. 11/038,944, dated Jul. 27, 2007.
U.S. Appl. No. 11/038,944, filed Jan. 18, 2005.

* cited by examiner

*Primary Examiner*—Yasin M Barqadle

(57) ABSTRACT

A method is disclosed for determining how often a client station in a network should send keepalive messages. Based on a measure of network load, a presence server determines a keepalive period, which is a time interval in which a client station needs to send a keepalive message, and the presence server reports this keepalive period to the client station. The client station responsively sends a keepalive message to the presence server within the determined keepalive period.

25 Claims, 5 Drawing Sheets

METHOD AND SYSTEM FOR UPDATING NETWORK PRESENCE RECORDS AT A RATE DEPENDENT ON NETWORK LOAD

BACKGROUND

1. Field of Invention

The present invention relates to telecommunication network and, more particularly, to managing presence information on a network.

2. Description of Related Art

In general, a presence server on a packet-switched network can maintain records indicating the presence status of various users (or, equivalently, stations), that is, whether the users have IP addresses and are online and therefore available to engage in packet-data communications. Further, the presence server can be arranged to notify certain users when changes occur in the presence state of certain other users.

For instance, under the well-known Session Initiation Protocol (SIP), when a user acquires an IP address, it can automatically send a SIP REGISTER message to the presence server, and the presence server would record that the user is online. Typically, the REGISTER message will carry with it an expiration time, which indicates how long the registration would remain active. To maintain the registration, the user would send a new REGISTER message before the last one expires.

Applying "presence extensions" to SIP, a user can then send a SIP SUBSCRIBE message to the presence server, asking the presence server to notify it when one or more other users goes online or offline. When one of the other users goes online or offline, the presence server would then send a SIP NOTIFY message to the user who subscribed to be notified, telling the user of the change in presence status.

This process can be used to facilitate upkeep of "buddy lists" on client stations, to enable group communications such as instant messaging or push-to-talk communication for instance. By way of example, each client station that is a member of a group (or is used by a member of a group) may subscribe to the presence server to be notified when any member of the group goes online or offline. Using the process described above, the presence server would then notify each subscribing member when a change in presence status occurs with respect to another member of the group. Upon receipt of a NOTIFY message indicating a change in presence status of a group member, a client station can then update its buddy list. A user of the client station can thereby know which group members are available at any given time to engage in group communications.

SUMMARY

Ideally, a presence server would be constantly updated with presence information regarding users, so that the presence server can provide real-time presence updates to users who have subscribed to be notified of changes in presence state. Unfortunately, however, a presence server does not normally receive constant updates. Rather, as noted above, presence updates in the form of new REGISTER messages are typically sent just to avoid expiration of an existing registration.

Without constant updates to the presence server, it is possible that the presence server will have outdated information and that the presence server will therefore be unable to provide current, accurate notifications to subscribing users. For instance, it is possible that a user who has registered with a presence server may lose network connectivity. By way of example, if the user is operating a wireless handheld device such as a 3G mobile station, the user may lose radio connectivity. Yet the presence server would not immediately be aware of the loss of connectivity and would therefore not immediately report the change in presence status to other subscribing users.

One way to solve this problem is for users to periodically send keepalive messages to the presence server. For instance, users could send keepalive messages to the presence server often enough to be considered a constant indication of presence status. When the presence server stops receiving keepalive messages from a given user, the presence server can then interpret that as an indication that the user is no longer online. In response, the presence server can update its presence status records accordingly and can notify any subscribing users about the change in status.

Having all or many users send keepalive messages to the presence server at a very high rate, however, can bog down a network. This can be particularly problematic where the messages flow though a bandwidth-constrained network link, such as wireless air interface for instance.

By way of example, in a cellular communication system, if all of the mobile stations operating in a particular sector regularly and often send SIP PUBLISH messages to a presence server, the air interface of that sector can be tied up. At a minimum, if the keepalive messages are packet-data such as SIP messages, all of the mobile stations would need to acquire radio link traffic channels over which to send the keepalive messages, thereby diminishing the bandwidth available to carry other bearer traffic.

The present invention provides a mechanism for approaching the ideal of constant presence updates, but without overburdening a network that carries the messages. In accordance with an exemplary embodiment, users will adjust the rate at which they send keepalive messages to a presence server, based on a measure of network load.

To carry out the exemplary embodiment in practice, a presence server may send a response (e.g., acknowledgement) message to a user each time the presence server receives a register or keepalive message from the user, and the presence server may specify in that response message an interval of time that the user should wait before sending a next keepalive message. The user may then wait that specified keepalive period before sending a next keepalive message to the presence server.

In the exemplary embodiment, the keepalive period that the presence server specifies in each response message will be set depending on network load. As an example, if the network is particularly congested (as of a last measurement), then the presence server may specify a longer keepalive period, to avoid burdening the already congested network with transmission of keepalive messages. As another example, if the network is not so congested, then the presence server may specify a shorter keepalive period, to better approach the ideal of constant or real-time presence updates.

The presence server can determine the measure of network load in various ways. For example, the presence server can communicate with a controller that has access to network load information. The presence server can periodically poll the controller for an update on network load, or the controller can periodically push an update on network load to the presence server. Alternatively, the presence server could query the controller for a network load update each time the presence server receives a keepalive signal from a user. Still alternatively, the presence server could also have a built-in module that monitors network load information.

In another exemplary embodiment of the present invention, the presence server monitors changes in network load. The presence server sends out messages specifying keepalive periods to users if the change in network load is greater than a threshold value. The user may then send out the next keepalive message to the presence server according to the specified keepalive period.

These as well as other aspects and advantages will become apparent to those of ordinary skill in the art by the following detailed description, with appropriate reference to the accompanying drawings.

BRIEF DESCRIPTION OF DRAWINGS

Exemplary embodiments of the present invention are described herein with reference to the drawings, in which.

DETAILED DESCRIPTION OF EXEMPLARY EMBODIMENTS

1. Exemplary Method of Updating Network Presence Records

Figure 1:
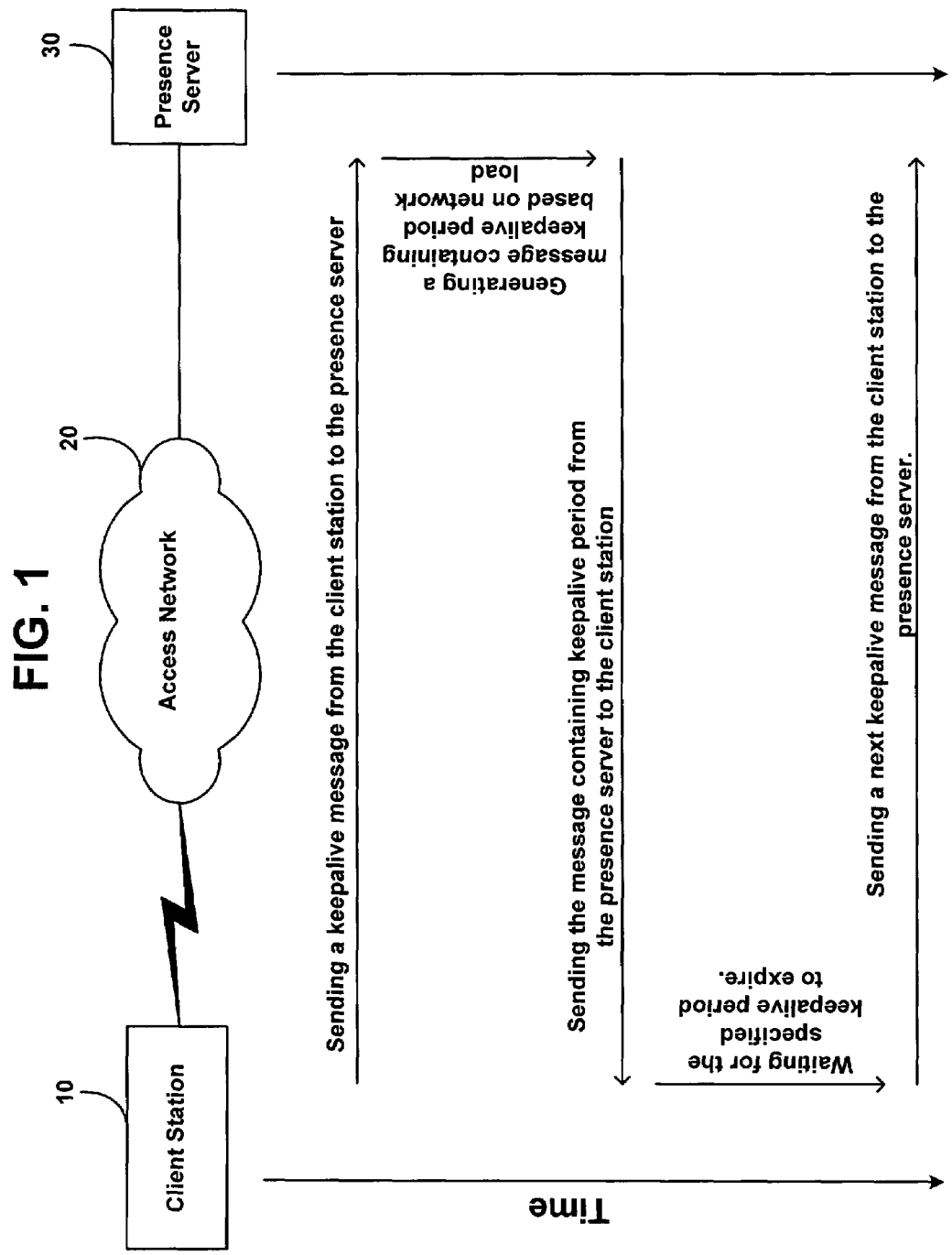
FIG. 1 is an exemplary block diagram illustrating a method for updating network presence records at a rate dependent on network load.

Referring to the drawings, FIG. 1 is a block diagram illustrating an exemplary method for updating network presence records at a rate dependent on network load. As shown in FIG. 1, the method involves a client station 10, an access network 20, and a presence server 30. The client station 10 is connected to the access network 20, through which the client station 10 communicates with the presence server 30. To inform the presence server 30 that the client station 10 is still online, the client station 10 sends a keepalive message to the presence server 30 through the access network 20. In response to the keepalive message received from the client station 10, the presence server 30 generates a response message containing a keepalive period based on a measure of network load. The presence server 30 may select the keepalive period upon receiving the keepalive message from the client station 10. Alternatively, the presence server 30 may select the keepalive period periodically and use the most recently selected keepalive period to generate the response message containing keepalive period. If network is congested, the presence server may select a long keepalive period so that the client station 10 would not worsen network congestion by sending keepalive messages too often. On the other hand, if the network load is light, the presence server may select a short keepalive period so the presence record is updated more often. The presence server 30 then sends message containing the keepalive period to the client station 10 through the access network 20. After having learned the keepalive period from the presence server 30, the client station 10 waits for the keepalive period specified by the presence server 30 to expire before sending a next keepalive message to the presence server 30 through the access network 20.

The exemplary block diagram in FIG. 1 shows that the presence server 30 generates a message containing keepalive period after having received a keepalive message from the client station 10. However, receiving a keepalive message from the client station 10 does not have to be a triggering event for the presence server 30 to select a keepalive period for the client station. The presence server 30 may, upon its startup, determine a measure of network and then select a keepalive period based on the network load. The presence server 30 may then report the selected keepalive period to one or more client stations. The one or more client stations may respond by sending keepalive messages to the presence server 30 at the time specified by the keepalive period.

a. Exemplary Client Station

Figure 2:
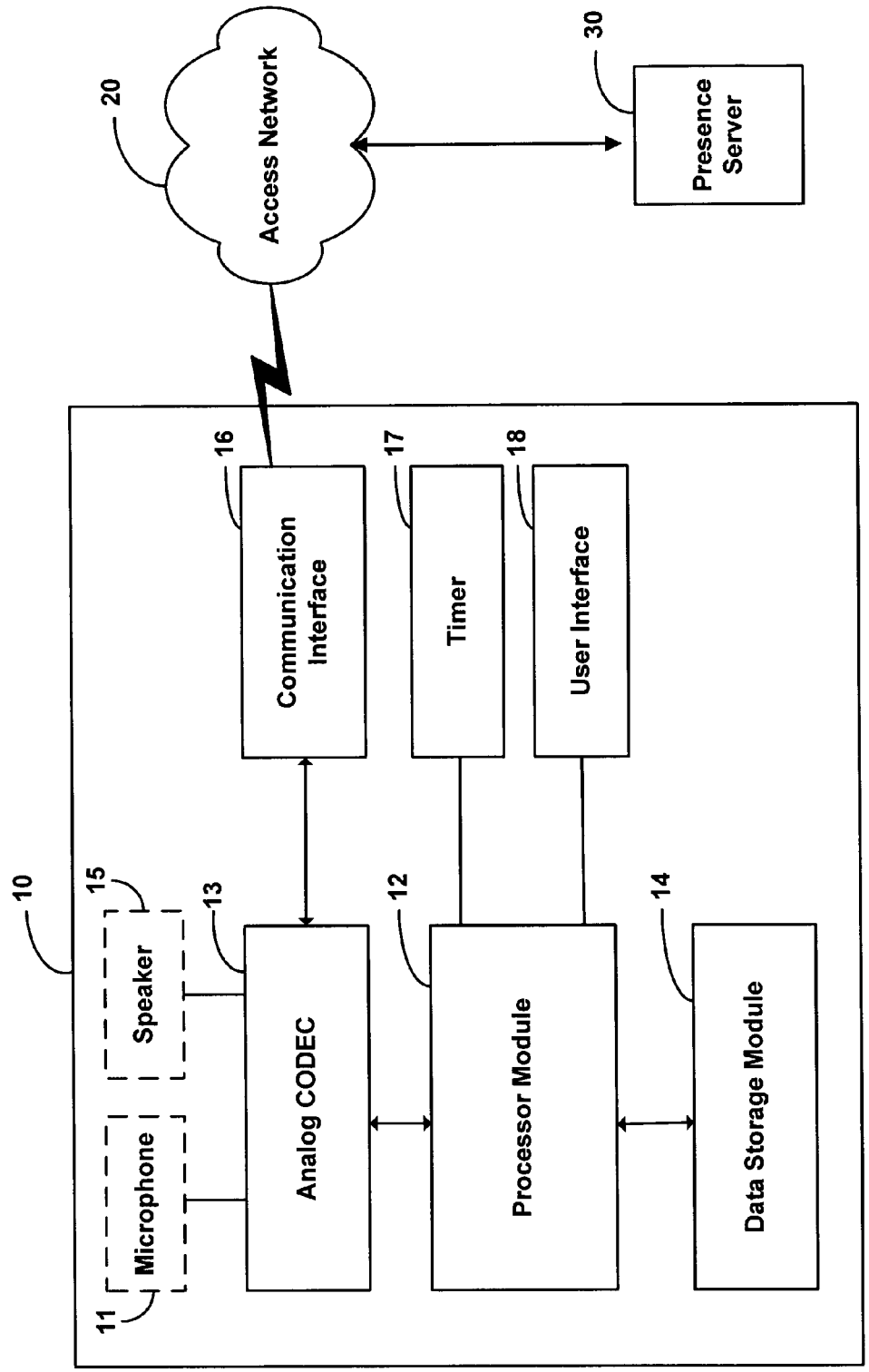
FIG. 2 is a functional block diagram illustrating the components of a client station.

The client station 10 may take various forms. For example, the client station 10 may be (but is not limited to) a wireless mobile station, a stationary telephone that is connected to a packet-switched network via a voice-over-IP connection, or a personal computer running an online instant messaging program on the Internet. FIG. 2 is a functional block diagram illustrating components of an exemplary client station. The client station 10 contains, among other things, a communication interface 16, a processor module 12, an analog CODEC 13, a data storage module 14, a timer 17, and a user interface 18. The client station 10 may also include a microphone 11 and a speaker 15.

The communication interface 16 may be a transceiver, or the combination of a transmitter and a receiver. For a wireless mobile station, the communication interface 16 may include one or more RF transceivers, and the RF transceiver may be connected to antennas. When receiving data, the RF transceiver filters and downconvert RF signal into to analog baseband signals. When sending data, the RF transceiver filters, upconverts, and amplifies analog baseband signals into RF signals.

The communication interface 16 is connected to the analog CODEC 13. The analog CODEC 16 filters, samples, and digitizes baseband signals into binary signals for the processor module 12 to process. The analog CODEC 16 also converts binary signals from the processor module 12 to baseband signals, which are then fed to the communication interface 16. The analog CODEC 16 may also connect to the microphone 11 and the speaker 15. The analog CODEC 16 digitizes speech from the microphone 11 at a certain bit rate using the appropriate coding scheme. The analog CODEC 16 also decodes and converts digitized voice for outputting by the speaker 15.

The analog CODEC 13 is connected to the processor module 12. The processor module 12 may include one or more processors to execute program logic provided by logic instructions stored in the data module 14. The processor module 12 may also contain digital signal processors designed to perform signal manipulation at high speed. The processor module 12 is capable of generating and processing control messages such as keepalive messages. The processor module 12 also handles other functions of the client station 10. In FIG. 2, the processor module 12 is connected to a user interface 18, which may consist of a keyboard and a LCD display. The processor module 12 reads input commands from the keyboard and displays messages on the LCD display.

The processor module 12 is also connected to the data storage 14 and the timer 17. The data storage module 14 may include volatile memory, such as RAM, and/or non-volatile memory, such as Flash ROM. The data module 14 may store a plurality of machine language instructions that are executed by processor 12 to control many of the functions of the client station. The data storage module may also provide storage for customizable features, such as a user telephone directory.

The timer 17 shown in FIG. 2 is a separate module that is connected to the processor module 12. The timer 17 may also be a function of the processor module 12 and the data storage module 14. Connected to the processor module 12, the timer 17 may be set and reset by the processor module 12. The timer is further capable of notifying the processor module 12 when a set time is up. In an exemplary implementation, the timer 17 may be a counter that may be set by the processor module 12 and may be incremented by a system clock.

When the client station receives a message that contains information specifying keepalive period from the presence server 30, the communication interface 16 and the analog CODEC 13 converts the message to a digitized form for the processor module 12 to process. Based on the keepalive period, the processor 12 sets the timer 17. When the keepalive period expires, the timer 17 notifies the processor module 12. The processor module 12 then generates a new keepalive message, which may include, among other things, information on the identification of the client and the time when the keepalive message is generated. Finally, the analog CODEC 13 converts the keepalive message to analog signal, which is then sent out by the communication interface 16 to the presence server 30 through the access network 20.

b. Exemplary Presence Server

Figure 3:
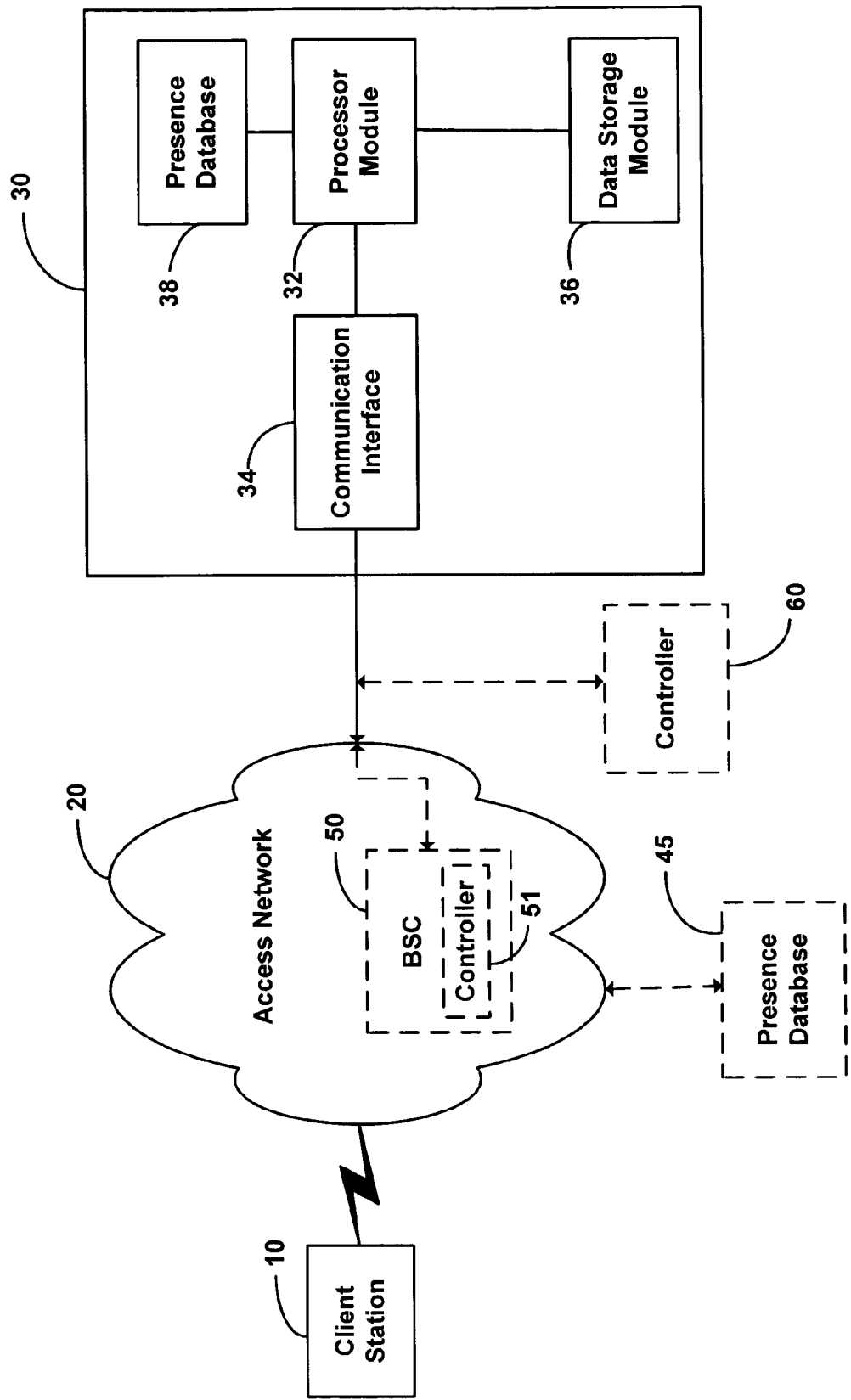
FIG. 3 is a functional block diagram illustrating the components of a presence server.

FIG. 3 is a functional block diagram illustrating the components of an exemplary presence server. The presence server 30 is connected to the access network 20, which also provides network access to the client station 10. The access network 20 may include network subsystems, such radio access network and packet-switched network. For example, if the access network 20 provides connection to wireless mobile stations, the access network may include a radio access network, which contains a base station controller (BSC), a base transceiver station (BTS), and a mobile switch center (MSC). The access network 20 may also include a packet-switched network, such as Internet and local area networks. Usually, the presence server 30 is connected to the packet-switched network. When a wireless mobile station sends out a keepalive message, the radio access network routes the message to the packet-switched network, which transfers the keepalive message to the presence server 30. In case where the access network 20 is a wireless communication network, the packet-switched network may be wireless connected to the radio access network and the presence server.

The presence server 30 in FIG. 3 has a processor module 32, a communication interface 34, a data storage module 36, and a presence database 38. The communication interface 34, which may be a transceiver or a combination of a transmitter and a receiver, connects the presence station to the access network 20. If the presence server 30 communicates with analog signals (when the presence server 30 is connected to a wireless local area network), the communication interface 16 may contain analog CODEC module to convert analog signals to digital signals for the processor module 34 to process. In case where the presence server 30 connects to the access network 20 through a packet-switched network, the communication interface 34 may simply be an RJ-45 connector.

The communication interface 34 is connected to the processor module 32. The processor module 32 may consist one or more processors to carry out program logic provided by logic instructions stored in the data storage module 36. The logic instructions enable the processor module 32 to, among other things, select keepalive periods based on the network load. The logic instructions may also enable the processor module 32 to obtain network load information of the access network 20.

The data storage module 36 may include volatile memory, such as RAM, and/or non-volatile memory, such as Flash ROM. The data storage module may contain customizable information, such as the network ID of the presence server and network configuration information. The program instruction stored in the data storage module may be updated if needed.

The processor module 32 may also be connected to the presence database 38. The presence database 38 contains the presence information of client stations that are connected to the access network 20. The presence information may be a list containing, among other things, the identification of client stations connected to the access network, the time when client stations sent the last keepalive messages, and home locations of client stations.

FIG. 3 illustrates the presence database 38 as parts of the presence server 30. However, the presence database 38 does not have to be a part of the presence server 30. For example, a presence database 45 may be an independent functional unit that is connected to the presence server 30 via the access network 20. The presence database 45 may be a central database for the entire access network 20, and it may be connected to other presence servers on the access network 20. The processor 32 may update and access the presence information stored in the database 45 through the access network 20.

In another exemplary embodiment, the presence server 30 does not have direct access to network load information, necessary for use in selecting a keepalive period. The presence server 30 may obtain network load information from a controller 51 that is part of the BSC 50, which is part of the access network 20. In another exemplary embodiment, a controller 60 is an independent functional unit that is connected to both the access network 20 and the presence server 30. Having access to the network load information, the controller 60 provides the network load information to the presence server 30 whenever it is needed.

When the presence server 30 receives a keepalive message from the client station 10, the communication interface 34 transfers (analog-to-digital data conversion may be needed where the presence server 30 is wirelessly connected to the access network 20) the keepalive message to that the processor 32. In response to the received keepalive message, the processor 32 updates the presence information that is stored in the database 38 and determines the current network load. Updating the presence information and determining the current network load may occur concurrently or sequentially, and if sequentially, the order of performing the two tasks is not important.

The processor module 32 may have a built-in function that is capable of obtaining network load information. The network load information may be a measure of network load of the radio access network or the network load of the entire access network 20, which may include, but is not limited to, a radio access network and the Internet. The processor module 32 may also determine the current network load by querying a controller that has access to network information. The controller may be the controller 51 that is part of the BSC 50 that is connected to the presence server or the controller 60 that is an independent unit that has access to network load information, which may be the number of client station connected to the radio access network, average ping time from one radio access network to another, amount of bandwidth used, etc.

Once the processor 32 has obtained the current network load information, it determines a keepalive period for the client station 10. There may be many ways to determine a keepalive period based on network load. One way to determine the keepalive period based on the network load is to have a lookup table in the data storage module 36 that stores keepalive periods that corresponds to different levels of network load. For example, 30% bandwidth usage may correspond to 30 minutes of keepalive period while 50% of bandwidth usage may correspond to 50 minutes of keepalive period. Another way to determine keepalive periods would be using mathematical formulae with the measure of network load as a variable to calculate keepalive periods. For example, keepalive period may be calculated by multiplying the number of client stations connected by a constant. There may be other ways to determine keepalive periods as well. With whatever method used, the more congested the network is, the longer the keepalive periods will be, and vice versa.

After the processor module 32 has determined the keepalive period for the client station, the presence server 30 reports the keepalive period to the client station 10. The processor module 32 may generate a keepalive period message that contains, among other things, a time interval within which the client station 10 needs to send a next keepalive message. The keepalive period message may also include other information, such as the status of the access network 20 and the presence information of other client stations. The presence server 30 sends the keepalive period message, which may be converted to analog signals by the communication interface if necessary, to the access network 20, which routes the message to the client station 10.

The presence server 30 may have functions in addition to determining and reporting keepalive periods. The presence server 30 may be responsible for updating presence database 45, which may be a central database that contains presence information for all client stations that are connected to the access network 20. For example, the presence server 30 may record the keepalive period that will be sent to the client station 10. If the client station 10 does not send a keepalive message within the specified keepalive period, the presence server 30 will update the presence database 45 so that the presence database 45 may list the client station 10 as inactive or disconnected.

2. Example: 3 G Cellular Communication System

Figure 4:
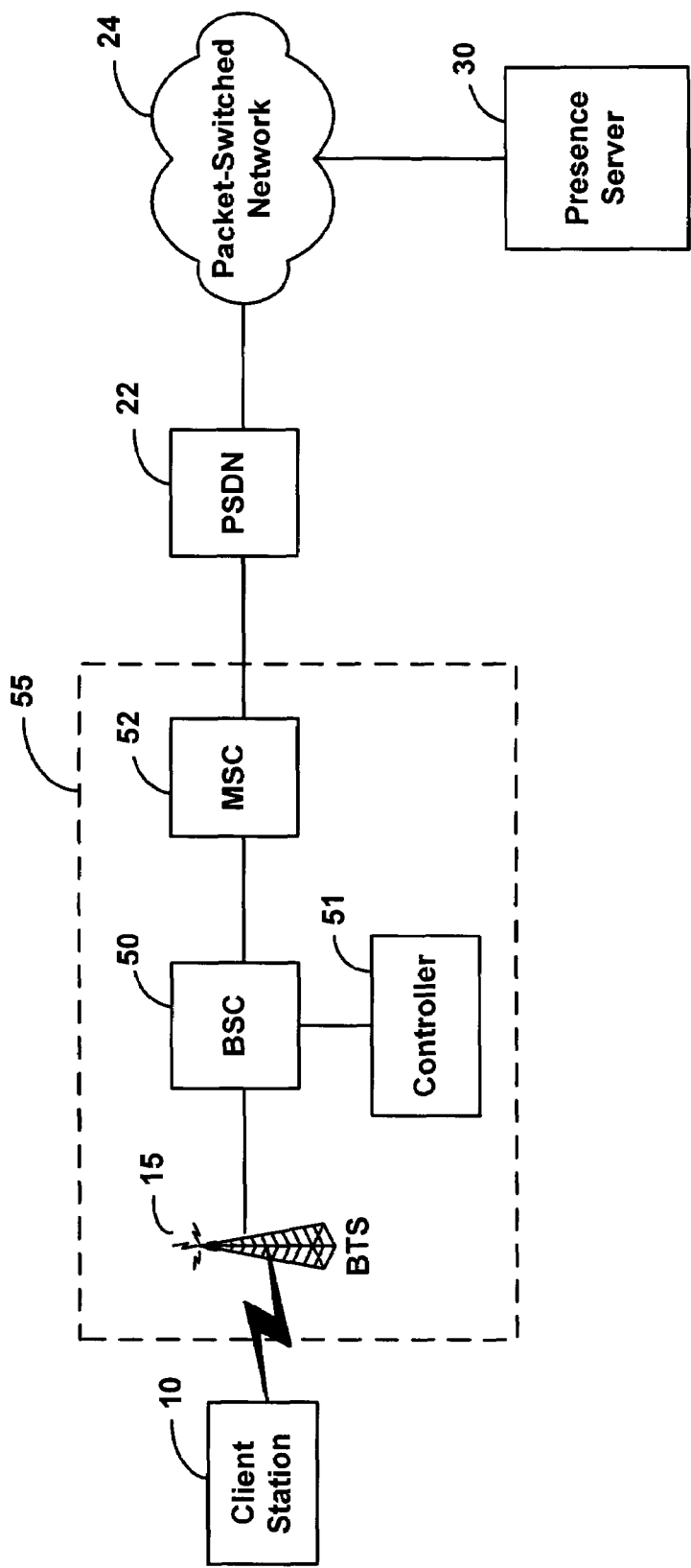
FIG. 4 is a diagram showing an exemplary embodiment in a 3 G cellular communication system.

The exemplary embodiment is particularly useful in (but not restricted to use in) a 3 G cellular communication system. FIG. 4 is a diagram showing an exemplary embodiment in a 3 G cellular communication system. In such a system, a client station 10 (a wireless mobile station in this case) may communicate wirelessly within a given cell sector with a radio access network 55, which includes, among other things a BTS 15, a BSC 50, a controller 51 that is coupled to the base station controller, and a MSC 52.

Upon power-on or in response to a triggering event, the mobile station 10 may acquire packet-data connectivity by sending a packet-data origination message. In response to that message, the BSC 50 assigns a radio link (air interface traffic channel) over which the mobile station can communicate. The MSC 52 manages the radio link for the client station and connects the call to the PDSN 22, and the PDSN 22 enters into a data link layer connection such as a point-to-point protocol (PPP) session with the mobile station. Further, the PDSN or a mobile-IP home agent may assign a mobile-IP address for the mobile station to use in communicating over the packet-switched network 24.

The presence server 30 may be connected to the packet-switched network and may provide presence services to client stations that are on the network. Client stations may be connected to the packet-switched network 24 via the radio access network 55, or some other access network, which may be a different radio access network or a local area network. The presence server 30 may provide various services. In one scenario, users of some of the mobile stations may be members of a buddy group and may desire to know whether the other users are online and available to engage in packet-data communications such as instant messaging or push-to-talk communication. For example, a group of cellular phone users may have American Online Instant Message program installed on their phones. Within this group of users, one user may wish to send an instant message to another user. To do so, the user wishing to send message must know whether the other person is online. The presence server 30 provides information on whether this person is online.

When the presence server 30 determines the keepalive period for a mobile station, the presence server 30 first finds out whether the network is congested. Network congestion may occur at the radio access network and/or the packet-switched network. In this example, the presence servers 30 focuses on the network congestion of the radio access network 55. The presence server 30 obtains network congestion information from the BSC 50, which is coupled to a controller 51 that has access to network load information. (Alternatively, the controller may be integrated as a function of the presence server or as a function of the BSC.) The controller 51, connected to the BSC, monitors the network load of the radio access network. When the presence server 30 queries the BSC for network load information, the controller 51 provides the network load access information, which may be a percentage of the bandwidth usage or the number of client stations connected to the radio access network 55. There might be variation: the controller 51 may also periodically push the network load updates to the presence server 30, the presence server 30 may periodically query the controller 51 for network load updates, or the presence server 30 may query the controller 51 for a network load update each time the presence server 30 receives a keepalive message from a client station.

The network load updates that the controller 51 provides to the presence server 30 could be general indications of network load, not specific to any given sector. For instance, if controller data reflects that any sector is more than 70% loaded, then the network load update might indicate a "high" level of congestion, whereas, if controller data reflects that no sector is more than 25% loaded, then the network load update might indicate a "low" level of congestion. Alternatively, the network load updates could be specific indications, specifying load for one or more particular sectors, such as by sector ID.

In the exemplary embodiment, a mobile station 10 will send a keepalive message to the presence server 30. The keepalive message in this 3 G scenario could be a SIP REGISTER message, a SIP PUBLISH message or some other sort of packet-data. Or it could take some other forms, such as a mobile-initiated SMS message for instance. The form of the message is not critical.

In turn, the presence server 30 will determine the network load. For example, the presence server 30 may refer to the latest network load update that it received form the controller 51. As another example, the presence server 30 may query the controller 51 for a network load update. In this regard, the query may ask for a general read on network load, or the query may be specific to the mobile station that sent the keepalive signal. For instance, the mobile station 10 may have included in its keepalive signal the sector ID of the sector in which the mobile station is currently operating (which the mobile station would know through normal cellular signaling). And the presence server 30 may then learn from the controller 51 what the level of network load is for that sector.

Given the measure of network load, the presence server 30 would then select a keepalive period for the mobile station 10 to use next. The presence server would then specify that selected keepalive period within the response message that the presence server sends to the mobile station.

When the mobile station 10 receives the response message, the mobile station would then set its keepalive period to be the keepalive period specified in the response message. The mobile station would then wait that keepalive period (from the last keepalive message that it sent) before it sends another keepalive message to the presence server.

3. Variations

Note that the presence server needs not provide a keepalive period in every response message that it sends after receiving a keepalive message. It could provide a new keepalive period, for instance, only when it determines that network load had changed substantially for the better or worse as illustrated in FIG. 5.

Figure 5:
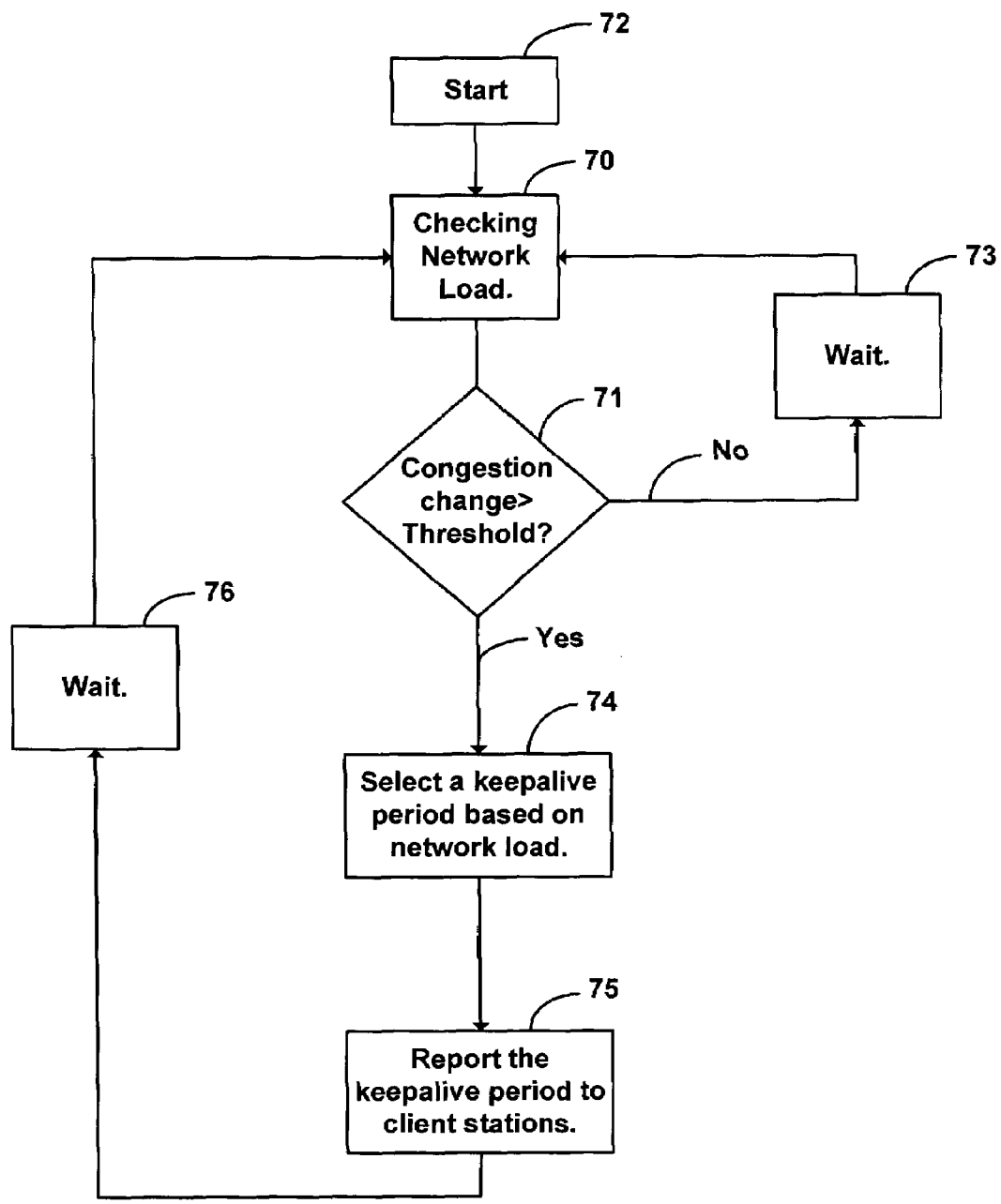
FIG. 5 is a flow chart showing an alternative method for updating network presence records at a rate dependent on network load by the presence server.

FIG. 5 is a flow chart showing an alternative method for updating network presence records at a rate dependent on network load by a presence server. The flow chart begins, which may correspond to presence server startup, at block 72, which immediately proceeds to block 70. In block 70 of FIG. 5, the presence server periodically checks the network load and determines whether the network load has substantially changed. If the change in network load is not greater than a threshold value (the threshold value may be a percentage change or a numerical value), which means that there is no substantial change in network load, then the presence server does nothing. The presence server simply waits, as indicated in block 73, for a period of time before checking network load again. If the change in network load is greater than a threshold value, the presence server would specify a new keepalive period for client stations connected to the network. The presence server first selects a keepalive period based on the current network load, as indicated in block 74, then it reports the keepalive period to some or all client stations that are connected to the network. The presence server then waits, as indicated in block 76, for a period of time before checking network load again.

As another example, the presence server could report a keepalive period to client stations in some manner other than within a response message. For instance, client stations could subscribe to be notified of a change in keepalive period. When the presence server determines that a sufficient change in network load has occurred, the presence server could then notify client stations of a new keepalive period.

Still further, an entity other than the presence server could select a keepalive period and/or could report the keepalive period to one or more users. For instance, in the 3 G scenario described above, the BSC or the controller could be arranged to select a keepalive period based on network load and to report the keepalive period to participating mobile stations.

Other variations are possible as well.

4. Conclusion

Exemplary embodiments of the present invention have been described above. Those skilled in the art will understand, however, that changes and modifications may be made to these embodiments without departing from the true scope and spirit of the invention, which is identified by the claims.

What is claimed is:

1. A method comprising:
   receiving a keepalive message from a client station, and sending to the client station an acknowledgement of the received keepalive message;
   determining a measure of network load;
   based on the measure of network load, selecting a keepalive period;
   reporting the selected keepalive period to the client station in the acknowledgement of the received keepalive message; and
   the client station responsively sending a next keepalive message to a presence server at a time determined based on the selected keepalive period reported in the acknowledgement.

2. The method of claim 1, wherein the client station is a wireless mobile station.

3. The method of claim 1, wherein the determining a measure of network load comprises:
   the presence server querying a controller that has access to network load information.

4. A presence server in a communication network, comprising:
   a first module arranged to receive keepalive messages from at least one client station;
   a second module arranged to select a keepalive period based on a measure of network load; and
   a third module arranged to send acknowledgements of the received keepalive messages to the at least one client station, and to report the selected keepalive period to the at least one client station in the acknowledgements.

5. The presence server of claim 4, wherein the presence server at fixed time intervals polls a controller to obtain network load information.

6. The presence server of claim 4, wherein the communication network is a wireless communication network.

7. The presence server of claim 4, wherein the presence server is coupled to a controller, the controller keeping track of network load information.

8. The presence server of claim 4, wherein the presence server is embedded with a controller that keeps track of network load information.

9. A system comprising:
   at least one client station;
   a presence server;
   the presence server receiving a keepalive message from the at least one client station and sending to the at least one client station an acknowledgement of the received keepalive message;
   the presence server determining a keepalive period based on network load and sending an indication of the determined keepalive period to the at least one client station in the acknowledgement; and
   the at least one client station sending subsequent keepalive signals according to the keepalive period indicated in the response.

10. The system of claim 9, further comprising a controller that has access to network load information.

11. The system of claim 10, wherein the controller periodically pushes network load information to the presence server.

12. The system of claim 9, wherein the at least one client station and the presence server communicate via a wireless communication network.

13. The system of claim 9, wherein the at least one client station and the presence server communicate via a packet-switched network.

14. A method comprising:
sending a first keepalive message from a client station to a presence server, and sending from the presence server to the client station an acknowledgement of the first keepalive message;
selecting a keepalive period based on a measure of network load;
reporting the selected keepalive period to the client station in the acknowledgement of the first keepalive message;
using the selected keepalive period to determine when the client station should send a next keepalive message to the presence server; and
sending the next keepalive message from the client station to the presence server.

15. The method of claim 14, wherein selecting the keepalive period based on the measure of network load comprises:
the presence server selecting the keepalive period based on the measure of network load.

16. The method of claim 14, wherein the first keepalive message comprises a Session Initial Protocol message.

17. The method of claim 14, wherein the method is used for dynamically determining keepalive periods in a wireless communication system, the wireless communication system serving one or more wireless mobile subscribers.

18. A client station in a communication network, the client station comprising:
a receiver;
a transmitter;
a timer;
at least one processor;
data storage holding program instructions;
the program instructions being executable by the at least one processor to send a keepalive message through the transmitter, and to receive through the receiver an acknowledgement of the keepalive message, the acknowledgement containing information defining a keepalive period, the keepalive period being selected based on network load; and
the program instructions being further executable by the at least one processor, in response to receiving, in the acknowledgement, the information defining the keepalive period, to:
(i) set the timer according to the keepalive period, and
(ii) send a new keepalive message through the transmitter when the timer expires.

19. A system for dynamically determining keepalive periods in a wireless communication network, comprising:
at least one base station;
a presence server;
a packet-switched network;
the presence server being capable of communicating with at least one mobile subscriber through the packet-switched network;
the presence server receiving a keepalive message from the at least one mobile subscriber through the packet-switched network and sending to the at least one client station an acknowledgement of the received keepalive message; and
the presence server selecting a keepalive period for the at least one mobile subscriber based on measures of network load, and the presence server reporting the selected keepalive period to the at least one mobile subscriber in the acknowledgement, through the packet-switched network.

20. The system of claim 19, wherein the presence server at fixed time intervals polls a controller to obtain the measures of network load.

21. The system of claim 19, wherein the presence server determines the measures of network load by querying a controller that has access to the measures of network load.

22. The system of claim 19, wherein the presence server keeps track of network bandwidth usage.

23. The system of claim 19, wherein the at least one mobile subscriber, upon receiving the selected keepalive period, sends a keepalive message at a time determined by the selected keepalive period.

24. A presence server in a communication network comprising:
a database, the database maintaining a list of client stations that are connected to the communication network; and
a timer;
wherein the presence server is programmed to:
receive keepalive messages from at least one client station and send to the at least one client station acknowledgements of the received keepalive messages,
select a keepalive period for the at least one client station based on a measure of network load,
report the selected keepalive period to the at least one client station in the acknowledgements, and
drop the at least one client station from the database if the presence server does not receive a new keepalive message within the selected keepalive period from the at least one client station.

25. A method comprising:
sending a first keepalive message from a client station to a presence server, and sending from the presence server to the client station an acknowledgement of the first keepalive message;
selecting a keepalive period based on a measure of network load;
reporting the selected keepalive period to the client station in acknowledgement;
using the selected keepalive period to determine when the client station should send a next keepalive message to the presence server; and
updating a database of the presence server based on whether the client station has sent a next keepalive message to the presence server within the selected keepalive period.

* * * * *

UNITED STATES PATENT AND TRADEMARK OFFICE
CERTIFICATE OF CORRECTION

PATENT NO. : 7,634,558 B1  Page 1 of 1
APPLICATION NO. : 10/667881
DATED : December 15, 2009
INVENTOR(S) : Mangal et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1560 days.

Signed and Sealed this

Ninth Day of November, 2010

David J. Kappos
*Director of the United States Patent and Trademark Office*